(12) United States Patent
Millett et al.

(10) Patent No.: US 7,774,353 B2
(45) Date of Patent: Aug. 10, 2010

(54) SEARCH TEMPLATES

(75) Inventors: Ronald P. Millett, Orem, UT (US);
Dillon K. Inouye, Provo, UT (US); John C. Higgins, Orem, UT (US); John P. Pratt, American Fork, UT (US)

(73) Assignee: Perfect Search Corporation, Provo, UT (US)

( * ) Notice: Subject to any disclaimer, the term of this patent is extended or adjusted under 35 U.S.C. 154(b) by 435 days.

(21) Appl. No.: 11/847,869

(22) Filed: Aug. 30, 2007

(65) Prior Publication Data

US 2009/0063479 A1    Mar. 5, 2009

(51) Int. Cl.
G06F 7/00     (2006.01)
G06F 17/30    (2006.01)

(52) U.S. Cl. .................................... 707/758; 707/789
(58) Field of Classification Search .................. None
See application file for complete search history.

(56) References Cited

U.S. PATENT DOCUMENTS

| | | | |
|---|---|---|---|
| 4,961,139 A | 10/1990 | Hong et al. | |
| 5,530,854 A | 6/1996 | Emery et al. | |
| 5,664,179 A | 9/1997 | Tucker | |
| 5,699,441 A * | 12/1997 | Sagawa et al. | 382/100 |
| 5,701,459 A | 12/1997 | Millett | |
| 5,737,734 A | 4/1998 | Schultz | |
| 5,740,445 A | 4/1998 | Okuda | |
| 5,761,652 A | 6/1998 | Wu | |
| 5,799,312 A | 8/1998 | Rigoutsos | |
| 6,018,733 A | 1/2000 | Kirsch et al. | |
| 6,026,398 A | 2/2000 | Brown | |
| 6,128,613 A | 10/2000 | Wong et al. | |
| 6,216,123 B1 | 4/2001 | Robertson et al. | |
| 6,233,571 B1 | 5/2001 | Egger et al. | |
| 6,253,188 B1 * | 6/2001 | Witek et al. | 705/14.54 |

(Continued)

FOREIGN PATENT DOCUMENTS

WO    WO2007082212 A2    7/2007

(Continued)

OTHER PUBLICATIONS

U.S. Appl. No. 12/143,432, filed Jun. 20, 2008, Millett.

(Continued)

*Primary Examiner*—Pierre M Vital
*Assistant Examiner*—Loan T Nguyen
(74) *Attorney, Agent, or Firm*—Workman Nydegger (57) ABSTRACT

Searching a data store for parameter patterns specified in a query. A method includes receiving a query from a user including N parameter patterns. One or more alternatives are associated to one or more of the N parameter patterns. One or more templates are created. Each of the templates describes a number of microsearches. Each of the microsearches includes one or more of the N parameter patterns or the alternatives. Microsearches described by at least one of the one or more templates are enumerated. One or more sub-microsearches are performed by searching for parameter patterns and/or alternatives. Each sub-microsearch may have less than all terms needed for a full microsearch. Based on the results of the one or more sub-microsearches, one or more microsearches are eliminated from searching. The data store is searched using one or more of the remaining microsearches.

20 Claims, 6 Drawing Sheets

U.S. PATENT DOCUMENTS

| | | | |
|---|---|---|---|
| 6,473,729 | B1 | 10/2002 | Gastaldo et al. |
| 6,658,626 | B1 | 2/2003 | Aiken |
| 6,584,458 | B1 | 6/2003 | Millett et al. |
| 6,584,465 | B1 | 6/2003 | Zhu |
| 6,718,325 | B1 | 4/2004 | Chandra |
| 6,748,401 | B2 | 6/2004 | Blackburn |
| 6,772,141 | B1 | 8/2004 | Pratt et al. |
| 6,778,981 | B2 | 8/2004 | Lee |
| 6,785,677 | B1 | 8/2004 | Fritchman |
| 6,804,664 | B1 | 10/2004 | Hartman et al. |
| 6,947,931 | B1 | 9/2005 | Bass et al. |
| 6,985,904 | B1 | 1/2006 | Kaluskar et al. |
| 6,993,533 | B1 * | 1/2006 | Barnes ............... 1/1 |
| 7,139,753 | B2 | 11/2006 | Bass et al. |
| 7,181,438 | B1 | 2/2007 | Szabo |
| 7,266,553 | B1 | 9/2007 | Anderson et al. |
| 7,590,716 | B2 | 9/2009 | Sinclair |
| 2002/0099536 | A1 | 7/2002 | Bordner et al. |
| 2002/0099685 | A1 | 7/2002 | Takano |
| 2004/0225643 | A1 | 10/2004 | Alpha et al. |
| 2004/0260694 | A1 | 12/2004 | Chaudhuri et al. |
| 2005/0108394 | A1 | 5/2005 | Braun et al. |
| 2005/0131872 | A1 | 6/2005 | Calbucci et al. |
| 2005/0171926 | A1 | 8/2005 | Thione |
| 2006/0004740 | A1 | 1/2006 | Dettinger |
| 2006/0036649 | A1 | 2/2006 | Simske et al. |
| 2006/0080361 | A1 * | 4/2006 | Suzuki et al. ............ 707/104.1 |
| 2006/0106793 | A1 | 5/2006 | Liang |
| 2006/0126916 | A1 * | 6/2006 | Kokumai .................... 382/151 |
| 2006/0212420 | A1 | 9/2006 | Murthy |
| 2006/0235843 | A1 | 10/2006 | Musgrove et al. |
| 2007/0027864 | A1 | 2/2007 | Collins et al. |
| 2007/0033165 | A1 | 2/2007 | Sheinwald et al. |
| 2007/0073894 | A1 | 3/2007 | Erickson et al. |
| 2007/0106876 | A1 | 5/2007 | Goswami |
| 2007/0156677 | A1 | 7/2007 | Szabo |
| 2007/0175674 | A1 | 8/2007 | Brinson |
| 2007/0203898 | A1 | 8/2007 | Carmona |
| 2007/0250494 | A1 | 10/2007 | Peoples et al. |
| 2008/0154938 | A1 | 6/2008 | Cheslow |
| 2009/0019038 | A1 | 1/2009 | Millett |

FOREIGN PATENT DOCUMENTS

| | | |
|---|---|---|
| WO | WO2007103815 A2 | 9/2007 |

OTHER PUBLICATIONS

U.S. Appl. No. 12/143,441, filed Jun. 20, 2008, Millett.
U.S. Appl. No. 11/681,673, filed Mar. 2, 2007, Millett, et al.
U.S. Appl. No. 11/847,688, filed Aug. 30, 2007, Millett, et al.
U.S. Appl. No. 11/847,784, filed Mar. 30, 2007, Millett, et al.
Ceglowski, Maciej "Using Bloom Filters", Apr. 8, 2004, http://www.perl.com/pub/a/2004/04/08/bloom_filters.html, 4 pages.
Notice of Allowance mailed in U.S. Appl. No. 11/681,673 Oct. 5, 2009.
Office Action dated Nov. 27, 2009 cited in U.S. Appl. No. 11/847,688.
U.S. Appl. No. 11/328,863, filed Jan. 10, 2006, Millett.
U.S. Appl. No. 60/779,214, filed Mar. 3, 2006, Millett.
Manning, Christopher D. and Schutze, Hinrich Foundations of Statistical Natural Language Processing, The MIT Press, Cambridge Massachusetts, May 1999 (pp. 151, 158, 192-194, 377 and 532).
Mitra, Mandar et al. "An Analysis of Statistical and Syntactic Phrases", Jun. 1997.
Possas, Bruno et al. "Set-Based Vector Model: An Efficient Approach for Correlation-Based Ranking", Oct. 2005.
Office Action mailed Feb. 20, 2008 cited in related case U.S. Appl. No. 11/328,863.
Office Action dated Dec. 29, 2008 cited in U.S. Appl. No. 11/681,673.
Office Action dated Mar. 4, 2010 cited in U.S. Appl. No. 11/847,784.
Roblee, Chris, "Hierarchical Bloom Filters: Accelerating Flow Queries and Analysis", Lawrence Livermore National Laboratory FloCon 2008, dated Jan. 8, 2008.
U.S. Appl. No. 11/847,688, mail date Apr. 1, 2010, Notice of Allowance.

* cited by examiner

SEARCH TEMPLATES

BACKGROUND

Background and Relevant Art

Computers and computing systems have affected nearly every aspect of modern living. Computers are generally involved in work, recreation, healthcare, transportation, entertainment, household management, etc.

To facilitate the retrieval of electronic content from a database, several types of search engines and indexes have been developed. Initially, traditional databases were developed with fields of information that could only be searched through a rigid alphabetically ordering of associated fields, such as a last name field. Later, full text indexing was developed to provide greater searching flexibility. With a full text index, all words are indexed and can therefore be searched for within a document or record.

Often, search engines can provide results to a user in a ranked fashion. Ranking may be based on relevance or other factors. Additionally some search engines will provide results that include alternatives to search terms specified in a query. These results are typically ranked by relevance by taking into account the search terms in the records returned as compared to the search terms specified by a user. This ranking is typically accomplished by performing a union of searching of search terms for the entire database where each search term has a weight, and the relevance of a result is based on the combined weight of each search term that references the record or document. The highest ranked results are the records with the highest summation of weights coming from search terms. Computing the combined weights and sorting the highest ranked records to the top of this large set is cumbersome and computationally expensive.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method of searching a data store. The method may be practiced in a computing environment including a data store. The data store includes data items stored in records in the data store. The method includes acts for searching the data store for parameter patterns specified in a query. The method includes receiving a query from a user including N parameter patterns. One or more alternatives are associated to one or more of the N parameter patterns. One or more templates are created. Each of the templates describes a number of microsearches. Each of the microsearches includes one or more of the N parameter patterns or the alternatives. Microsearches described by at least one of the one or more templates are enumerated. One or more sub-microsearches are performed by searching for parameter patterns and/or alternatives. Each sub-microsearch may have less than all terms needed for a full microsearch. Based on the results of the one or more sub-microsearches, one or more microsearches are eliminated from searching. The data store is searched using one or more of the remaining microsearches.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

Some embodiments described herein are directed to ranking searches of a data store before the searches are performed as opposed to ranking results after searches are performed on the data store. For example, previously, search engines have searched records in the data store for search terms and alternatives to the search terms and then ranked the results according to the search terms or alternatives found in a particular record. Some embodiments described herein, instead rank the searches to be performed and perform a sufficient number of searches to obtain the desired number of results.

In particular, in one embodiment a system receives a query which includes a number of parameter patterns. Alternatives are associated with the parameter patterns from the query. Templates are then created where the templates generally describe a number of microsearches that can be performed. The microsearches are combinations of parameter patterns and/or alternatives that should be searched for in the data store. Microsearches for a template may be enumerated. Sub-microsearches, which are searches of parameter patterns representing less than some entire microsearch can be performed where the results of the sub-microsearch are used to eliminate microsearches from the enumerated microsearches. The sub-microsearches may also be able to be used to eliminate entire templates or to eliminate microsearches before they are enumerated. Remaining microsearches can be used to search the data store.

This method of searching may be especially useful for search methods where portions of a data store are eliminated from searching by identifying the absence of one or more parameter patterns or the intersection of one or more parameter patterns. Such a search method is illustrated in U.S. application Ser. No. 11/847,688 titled "Vortex Searching" filed concurrently herewith, which is incorporated herein by reference.

Figure 1A:
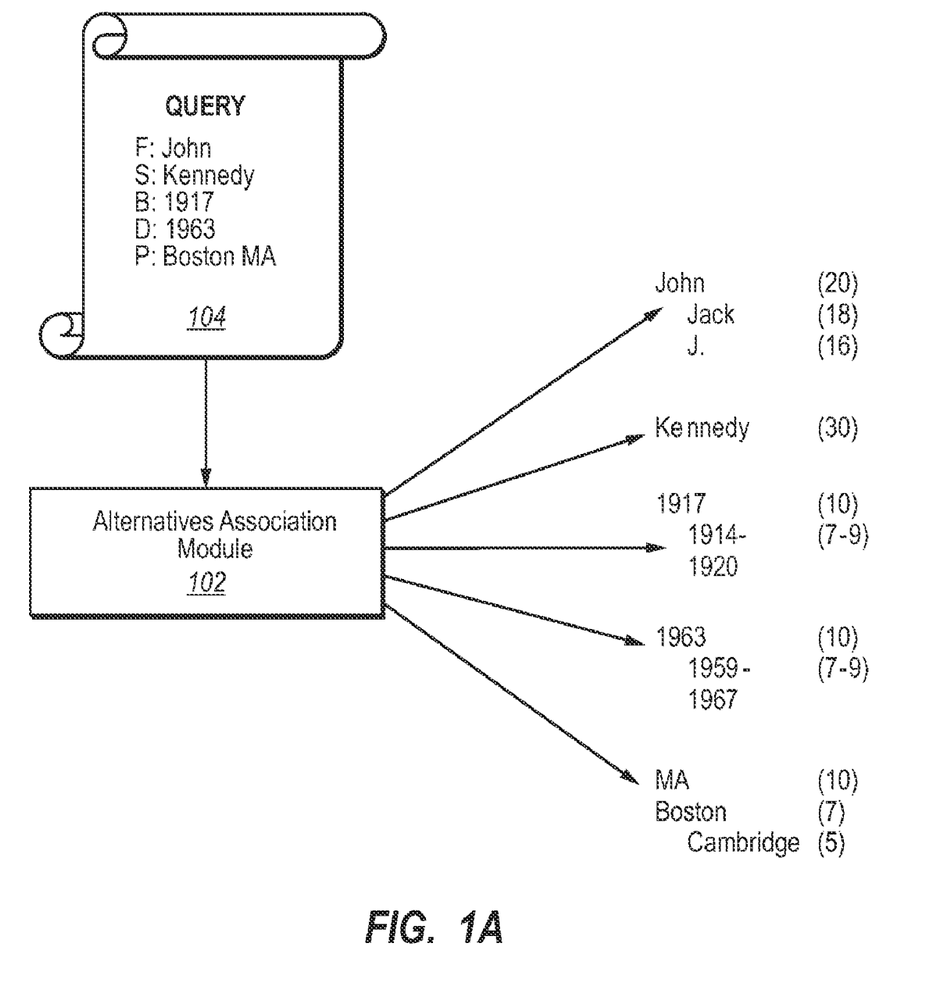
FIG. 1A illustrates associating alternatives to parameter patterns specified in a query.
Figure 1B:
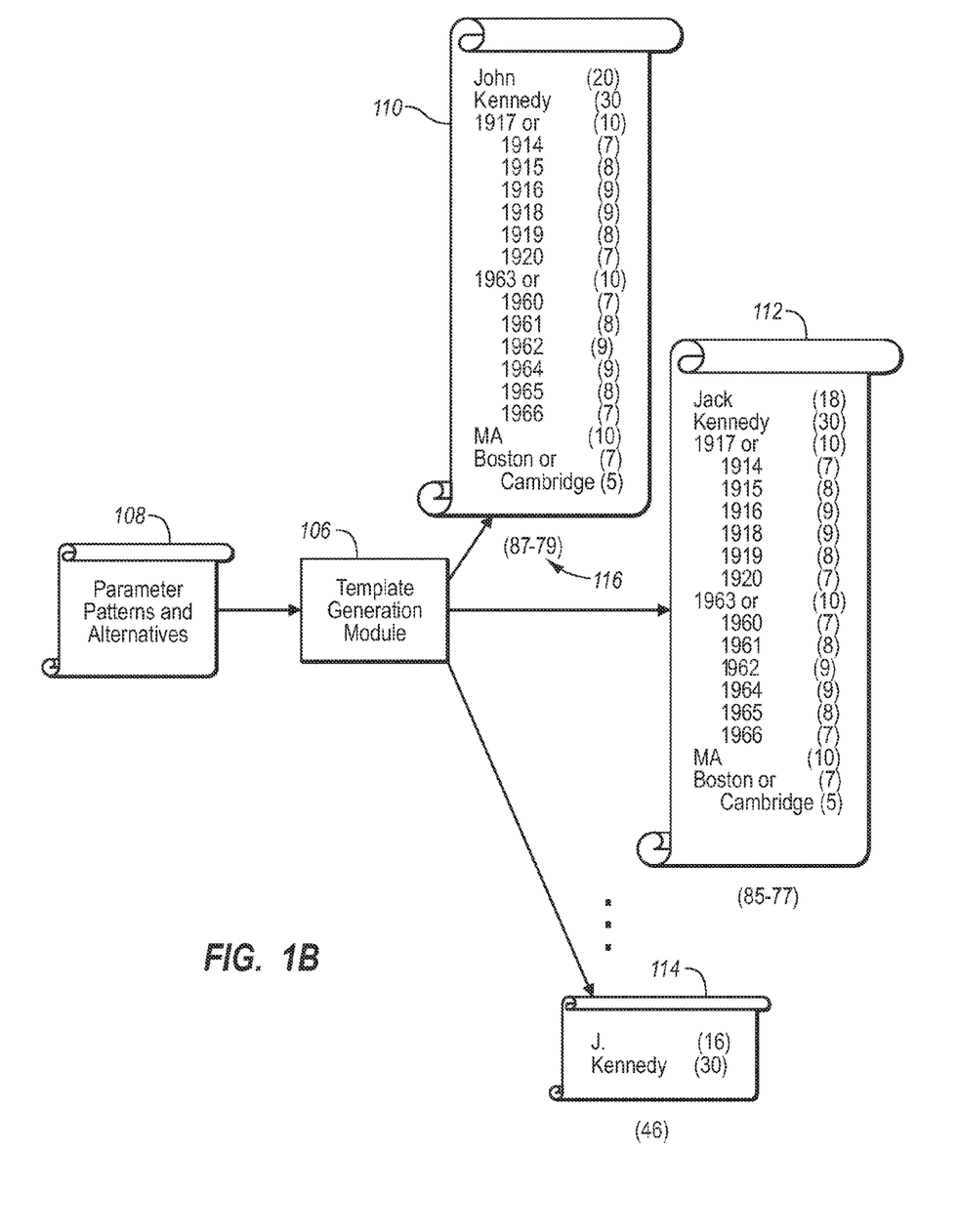
FIG. 1B illustrates generating templates describing microsearches.
Figure 1C:
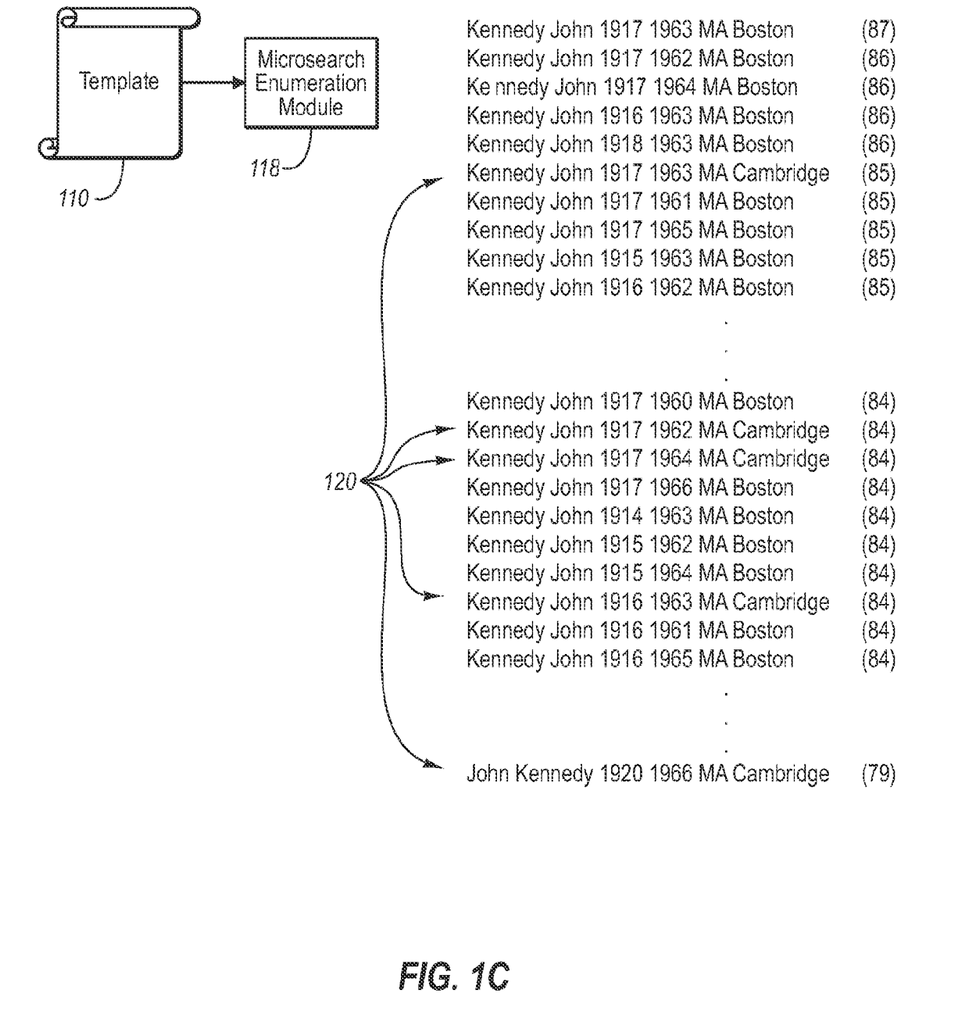
FIG. 1C illustrates enumerating microsearches.

Referring now to FIGS. 1A-1C, an embodiment is illustrated. FIG. 1A illustrates an alternatives association module 102, which may be, for example, a software module of a search engine system. A query 104 from a user may be received by the alternatives association module 102. The alternatives association module 102 associates alternative parameter patterns with parameter patterns specified in the query 104. For example, the query 104 includes a parameter pattern specifying a first name of John (F: John). Alternatives to John that may be assigned by the alternatives association module 102 include Jack and J. as illustrated.

FIG. 1A further illustrates that the query 104 includes a first name argument (F: John) a surname argument (S: Kennedy) a birth year argument (B: 1917), a death year argument (D: 1963) and a place argument (P: Boston Mass.). FIG. 1A also illustrates that the alternatives association module 102 associates alternatives with the first name (Jack and J.) birth year (1914-1920), death year (1959-1966) and place (Cambridge) arguments, as illustrated. Alternatives may be associated based on the functionality or environment in which the query 104 is implemented. In the example illustrated in FIG. 1A, no alternative is associated with Kennedy, perhaps because Kennedy is sufficiently unique that any alternatives would be irrelevant to a user submitting the query 104. For the birth years and death years, alternatives are associated based on the proximity to the year specified in the query. In the present example, alternatives are allowed to be three years before and after. For the place, in this example, the selected alternative is based on geographical proximity. Illustratively, Cambridge Mass. being geographically proximate to Boston Mass. causes Cambridge to be selected as an alternative.

In some embodiments, weights may be assigned at the alternatives association module 102 to the parameter patterns and alternatives (also referred to herein as alternative parameter patterns). The weights may define a relevance measurement for a parameter pattern or alternative. As might be expected, the parameter patterns specified in the query are often assigned weights indicating their being the most significant. While in this example, higher weights indicate more significance, other weighting systems may be used including lower weighting indicating more significance. Illustratively, FIG. 1A shows that a weight of 20, as indicated in the parenthesis, is assigned to the parameter pattern John. The alternative Jack has a weight of 18 assigned to it. The alternative J. has a weight of 16 assigned to it. Similarly, parameter patterns for birth and death years specified in the query each of a weight of 10 assigned to them. The alternatives are assigned a weight of 1 less for each year away they are from the year specified in the query. For example, for a parameter pattern 1917 specified in a query, the alternatives 1916 and 1918 each have a weight of 9. For the alternatives 1915 and 1919, the weight assigned is 8. For the alternatives 1914 and 1920, the weight assigned is 7. The example further illustrates that the weight assigned for MA is 10, the weight for Boston is 7, and the weight for Cambridge is 5. These weights may be used later in the process to determine which microsearches to search, when to enumerate microsearches from other templates, and when to create templates as will be explained in more detail herein.

Relevance ranking algorithms could be dynamic rather than static, with an update process based on feedback from the user. For example, a user searches for John Kennedy, b. 1917 in CT, died 1963 in TX. Suppose no acceptable result is found, and that the ranking algorithm only scored points for an exact hit in states. Suppose then that another search came in for John Kennedy, b. 1917 in RI, died 1963 in TX. A query log could be kept. When it is detected that an almost identical query has come in soon after the first query, then it is clear that the user is telling us that he is unsure of the state of birth. The ranking algorithm could be then be modified to give points for nearby states. Assuming the search is for JFK, including MA in the search would give the desired result.

Referring now to FIG. 1B, a template generation module 106 is illustrated. The template generation module receives as input the parameter patterns and alternatives associated with the parameter patterns from the alternative association module 102. The parameter patterns and alternatives 108 are used to create templates, such as templates 110, 112, and 114. Notably, FIG. 1B only shows a small sample of the possible templates that may be created. Each of the templates describes a number of microsearches, where each of the microsearches includes one or more of the parameter patterns from the query or the alternatives. Notably, as will be described later herein, templates may be generated on an as needed basis. This can help to conserve computing power as some templates may not be generated if they are not needed to achieve a given number of search results.

Each of the templates may have a weight or range of weights associated with them. The weights or range of weights are the weights of the microsearches described by the template. For example template 110 describes a microsearch John Kennedy 1917 1963 Boston Mass. In this example of one implementation, the weight of this microsearch is calculated by adding the weights of the individual parameter patterns or alternatives. Thus, this particular microsearch has a weight of (20)+(30)+(10)+(10)+(10)+(7)=87. At the less significant weight end, the template 110 describes a microsearch John Kennedy 1914 1960 Cambridge Mass. which has a weight of 79. Thus, the weight range 116 for the template 110 is 87-79. This weight range may be used when determining when to enumerate microsearches as will be described in more detail below.

FIG. 1C illustrates a microsearch enumeration module 118. While the template 110 may describe generally the micorsearches of a template 110, the microsearch enumeration module 118 may enumerate specifically all or a portion of the microsearches described by the template 110. FIG. 1C illustrates where all microsearches have been enumerated, although not all microsearches for the template 110 are shown. Notably, rather than enumerating all microsearches, microsearches may also be enumerated on an as needed basis as will be discussed in more detail below.

The system illustrated in FIGS. 1A-1C may further include functionality for performing sub-microsearches. Sub-microsearches are searches which include less than a given full microsearch. For example, for the microsearches enumerated in FIG. 1C, a sub-microsearch may be Kennedy-Cambridge as a single compound term or Kennedy-John-Cambridge as single compound term. Assuming that requirements for records returned for the query specify that all results must include the parameter pattern Kennedy, and if the sub-microsearch can identify that the terms Kennedy and Cambridge do not appear in the same record of the data store, then all microsearches including the term Cambridge can be eliminated from further searching. For example, at least the microsearches identified at 120, as well as a number of microsearches not shown for template 110 and for other templates can be eliminated from further searching. In some cases, entire templates can be eliminated from searching such that there is no need to generate a given template or to enumerate some microsearches.

Note that microsearches may be eliminated on a consolidated basis. For example, template 110 (although not shown in FIG. 1C) includes a segment from the 74th microsearch to the 83rd microsearch which is as follows:

| 74 | Kennedy John 1914 1966 MA Boston |
| 75 | Kennedy John 1915 1961 MA Cambridge |
| 76 | Kennedy John 1915 1965 MA Cambridge |
| 77 | Kennedy John 1916 1960 MA Cambridge |
| 78 | Kennedy John 1916 1966 MA Cambridge |
| 79 | Kennedy John 1918 1960 MA Cambridge |
| 80 | Kennedy John 1918 1966 MA Cambridge |
| 81 | Kennedy John 1919 1961 MA Cambridge |
| 82 | Kennedy John 1919 1965 MA Cambridge |
| 83 | Kennedy John 1920 1960 MA Boston |

In this example, microsearches 75-82 all include the term Cambridge. Embodiments may be implemented where loops, jumps, or groupings may be used to eliminate microsearches. For example, an elimination routine may use a "for" loop which is executed eight times to eliminate microsearches 75-82. Alternatively, a routine identifying included microsearches may jump over microsearches 75-82. Further, in another alternative, embodiments may be implemented where microsearches 75-82 are eliminated as a group or vector of microsearches.

The sub-microsearches may be performed using a number of different mechanisms. For example, different types of indexes and index searches may be used to perform the sub-microsearches. Examples of indexes that may be used include an abbreviated index or a full index of the data store.

An abbreviated index is a probabilistic data structure that identifies within some probability if a parameter pattern or combination of parameter patterns is included in a data store. The abbreviated index can quickly identify with a certainty that a parameter pattern is not included in a data store. Thus, the abbreviated index is well suited for searching sub-microsearches to eliminate microsearches. An example of an abbreviated index is illustrated in U.S. patent application Ser. No. 11/681,673, titled "Abbreviated Index" and filed on Mar. 2, 2007, which is incorporated herein by reference in its entirety. Additionally, the following illustrates generally the principles of abbreviated indexing.

Figure 2:
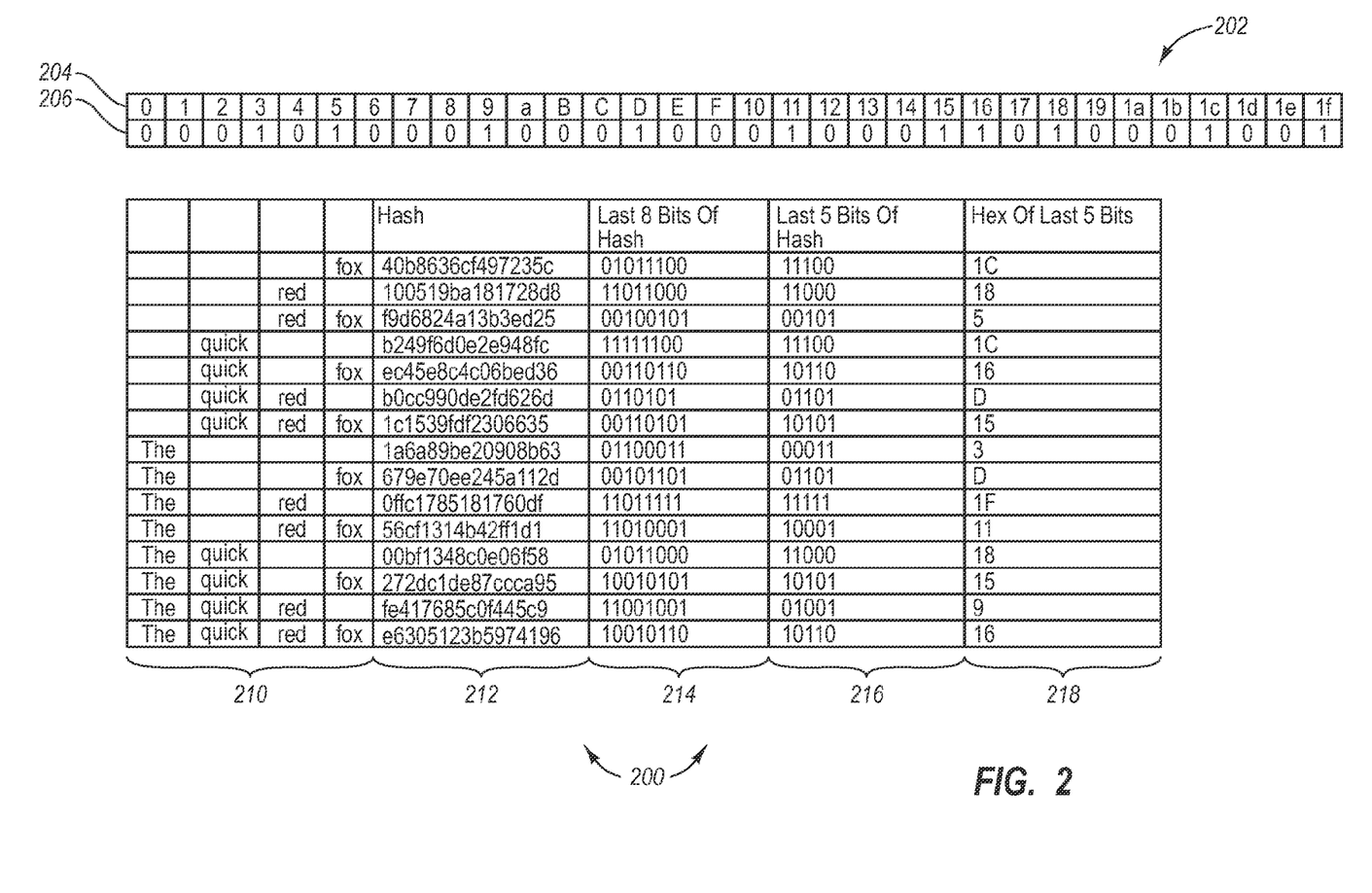
FIG. 2 illustrates an abbreviated index.

Referring now to FIG. 2, an abbreviated index 202 is illustrated, which in this example is a 32 bit binary number. The abbreviated index 202 is shown with an index field 204 and a value field 206. Notably, the index field 204 in this example is shown for convenience of explanation. The value field 206, in this example, includes the 32 bit binary number stored in physical memory. The index field 204 includes hexadecimal index representations of each of the elements of the 32 bit number represented in the value field 206.

FIG. 2 further illustrates a numerical representation table 208. The numerical representation table 208 includes a parameter patterns field 210, a numerical representation field 212, a last 8 bits field 214, a last 5 bits field 216, and a hex of the last 5 bits field 218.

The parameter patterns field 210 includes parameter patterns and combinations of parameter patterns, which may themselves be parameter patterns, on which operations can be performed. In this example, a data structure includes the text phrase "The quick red fox." In the example shown, combinations of individual words are represented as parameter patterns in the parameter patterns field 210. For example, "fox" is illustrated as a parameter pattern. "red" is illustrated as a second parameter pattern. "red fox" is illustrated as a single combined term parameter pattern. And so forth. Other types of patterns that can be applied to the abbreviated index or other index embodiments include, but are not limited to synonyms, homonyms, term attributes, proximities, term order, frequency, location, partial or incomplete terms, customized descriptions, related terms, phonetic, syntactic or semantic linguistic descriptions and so forth.

In the example illustrated in FIG. 2, the parameter patterns field 210 represents search strings that may be performed to locate elements in a data store, such as a data store including the phrase "The quick red fox."

The numerical representation field 212 in this example includes a numerical representation of each of the parameter patterns in the parameter patterns field 210. The numerical representations may be generated in any suitable fashion. In this particular example the numerical representations are hash values of the parameter patterns. For example, a hash calculation may be performed for the parameter "fox." This hash calculation results in a number, which in this example is represented as a 64 bit hexadecimal number. Preferably, the hash calculation is performed using a good algorithm that results in a high percentage of unique numbers for calculations performed on different parameters and parameter patterns. For example, it is preferable that a hash calculation for "fox" results in a number that is different from the hash calculation for "red." The other fields in the numerical representation table 208 will be explained in more detail at a later point herein. Notably, other identifiers than hash numbers may be used. Hash numbers are simply one embodiment of identifiers. Numerous other identifiers may be used as well.

Referring once again to the abbreviated index 202, each of the elements of the value field 206 represents a portion of a numerical representation 212 in the numerical representation table 208. Thus, the value field 206 contains a representation that a parameter pattern may be included in a set of parameters, such as a data store, based on the calculated hash for the parameter pattern. In this example, when a bit is set or as used herein "true," i.e. "1" in an element of the value field 206, this is an indication that a parameter pattern may be included within a set of parameters. Specifically, this indicates that a parameter pattern may be found in a data store which the abbreviated index 202 indexes.

For effective results, the abbreviated index 202 typically includes a number of elements that is equal to or greater than some multiple greater than 1 of the number of parameter patterns for a set of parameters. In the present example, 15 parameter patterns are included in the illustrated set of parameters. The abbreviated index 202 corresponding to the set of parameters therefore includes 32 elements (i.e. the 32 binary digits of the 32 bit binary number in the abbreviated index 202) which is a value greater than 2× of 15. Notably, the number of a multiplier (in this example 2) provides greater confidence that a parameter pattern is included in the set of parameters as the multiplier increases. For example, in the present 2× example, if a bit in the abbreviated index is set indicating that a parameter pattern may be included in the set of parameters, the confidence is about 50%. If a 64 bit binary number representing a 4× multiplier is used to represent the abbreviated index, confidence can be increased to about 75%. Similar increases in confidence can be achieved as the number of elements used to represent the abbreviated index is increased.

Now with particular emphasis on how the existence of parameter patterns are noted in the abbreviated index 202, note that FIG. 2 includes the last five bits of hash field 216. The last five bits of hash field represents the last five binary bits of the hexadecimal number in the numerical representation field 212. Five bits are selected because that is the number of binary bits needed to represent 32 unique binary numbers, the number of binary bits in the abbreviated index 202. Note that while the last five bits have been chosen in this example, embodiments are not limited to just the last bits. Any appropriate selection of bits can be used. In this example, so long as the same bits are used consistently to set bits in the abbreviated index 202, effective filtering can be performed.

For the parameter pattern "fox" in the parameter pattern patterns field 210, a hash of 40b8636cf497235c is calculated as shown in the numerical representation field 212. The last two hexadecimal numbers of the hash are 5c. These numbers represent the 8 bit binary number 01011100 as shown in the last 8 bits of hash field 214. By truncating the three most significant bits, the five least significant bits remain which are 11100 as shown in the last 5 bits of hash field 216. The last 5 bits can then be converted back to a hexadecimal number, which is 1c as shown in the hex of the last 5 bits field 218. Thus the bit indexed by 1c in the index field 204 is set in the value field of the abbreviated index 202. As illustrated, continuing this process for each of the parameter patterns in the parameter patterns field 210 results in the element in the value field 206 corresponding to the index numbers of 3, 5, 9, d, 11, 15, 16, 18, 1c, and 1f in the index field 204 of the abbreviated index 202 are set. Notably, the abbreviated index 202 includes a sampling of representations that can be maintained by the abbreviated index.

The abbreviated index 202 can then be used at a later time to determine the probability that a parameter pattern is represented in a data store. A check of the abbreviated index 202 can be made for the parameter pattern. This can be done by hashing the parameter pattern, and in this case, checking the last 5 bits of the hash as an identifier for the parameter pattern to see if the identifier appears in the abbreviated index 202. If it does not appear in the abbreviated index, it can be determined with 100% accuracy that the particular parameter pattern does not exist in the data store. However, if the identifier is in the abbreviated index 202 it is known, in this example, that there is about a 50% chance that the parameter pattern appears in the data store. This confidence can be increased by searching of related parameter patterns or making the abbreviated index array larger and more sparse. For example, if the search term entered by a user is "quick red fox," confidence can be increased by checking the abbreviated index 202 for indicators for "quick," "quick red," "red fox," "red," etc.

Sub-microsearches may also be performed on a full index of the data store. This can be performed either by searching for individual terms or by searching for combinations of terms that have been indexed in the index.

When using a full index, it may be helpful to augment the index with an offset correlation table. Offset correlation tables are described in more detail in U.S. patent application Ser. No. 11/847,688 titled "Vortex Searching", filed concurrently herewith, and incorporated herein by reference in its entirety. In one embodiment, an offset correlation table correlates portions of hashes for parameter patterns, such as the top given number of bits, with actual records where the parameter patterns may be found. Additionally, entries in the offset correlation table may indicate that no records are included in a data store for a particular portion of a hash.

Using the sub-microsearches, microsearches can be eliminated from the templates, so as to eliminate irrelevant or less relevant microsearches. Microsearches that have not been eliminated by the sub-microsearch searches can be used to provide results for the query 104. Notably, typically the system described herein will provide a given number of results rather than providing all possible results. Further, it is desirable that the most relevant results be returned. Thus, in one embodiment, the weighting described above is used to determine which microsearches should be searched first. Microsearches with a weight that indicates that they are more relevant will be searched before microsearches with weights indicating that they are comparatively less relevant.

A rareness table for each search element can be defined to help determine the most efficient patterns to be used for a given microsearch. One use would be to select the order of microsearches in such a way as to maximize elisions, hence avoiding some future microsearches altogether.

For example, suppose the query is to find Fauntleroy Fontinelli born in Wyoming in 1910 and dying in New York in 1970. A very inexpensive table lookup could determine that both the name and the state Wyoming are rare. Hence the pattern searches could be divided on the first (possibly) exact search to both include the name and birth state. For example one pattern search could be for Fauntleroy Fontinelli born in Wyoming in 1910 and the other could be the exact search with all elements specified. If no hits were retrieved for either, then the second search could check the abbreviated pattern index for the pattern of Fauntleroy Fontinelli born in Wyoming "near 1910" with a good probability that there will be no hits. If none, then there is no need for performing microsearches for any of the nearby birth years.

In the preceding, the concept of nearness has been introduced. While nearness will be discussed in more detail below in conjunction with the description of FIG. 3, certain principles will now be explained. Indexes may include entries for nearness. Additionally, the nearness can be quantified. Thus for example, 1911 and 1909 have the same nearness value to 1910 and are nearer to 1910 than 1912 and 1908. Thus, an index may include index entries for 1910_near_1 and 1910_near_2. Nearness can be defined in many different contexts. For example, as will be discussed in more detail below, nearness can be defined numerically, spatially, geographically, linguistically, etc.

One implementation of a rareness table would be a bit map for each possible element in a given search. This would work best for an element of finite range. Again using the U.S. state as an example, 9 states comprise 50% of the U.S. population (CA, TX, NY, FL, IL, PA, OH, MI, GA). Nine more states comprise the next quarter of the population, seven more the next eighth, and 25 the last eighth. Thus, a table with only two bits allocated per state could keep track the four degrees of rareness (or frequency) of being in the lower eighth, next eighth, next quarter, or upper half. In this example, a more useful table might be simply a one-bit table recording whether or not the state is common (upper 75%) or not (lower 25%). If the only use of this table is to determine how to divide up pattern searches, then a simple bit table might suffice.

In the case of many possible values for an element, one could extend the rareness table and base it on a ratio other than two. For example, with three bits per element (eight table values) and a base of four, one could partition the space into regions of the upper $3/4$, next $3/16$th ($4^2$), next $3/64$th ($4^3$), next $3/256$th ($4^4$), next $3/1,024$th ($4^5$), next $3/4096$th ($4^6$), next $3/16,384$th ($4^7$), and lowest $1/16,384$th.

Notably, microsearches will not necessarily be completed for a single template before microsearches from adjacent or other templates are searched. For example, FIG. 1B illustrates that template 110 includes microsearches with weights between 87 and 79. Template 112 includes microsearches with weights between 85 and 77. Thus, when microsearches with weights of 85 from the first template 110 are being searched, it may be desireable to also enumerate microsearches from the second template 112 and to possibly perform additional sub-microsearches to eliminate microsearches from the second template such that microsearches from the second 112, and eventually other subsequent templates, may be interleaved with microsearches from the first template 110 by weight as appropriate.

Figure 1D:
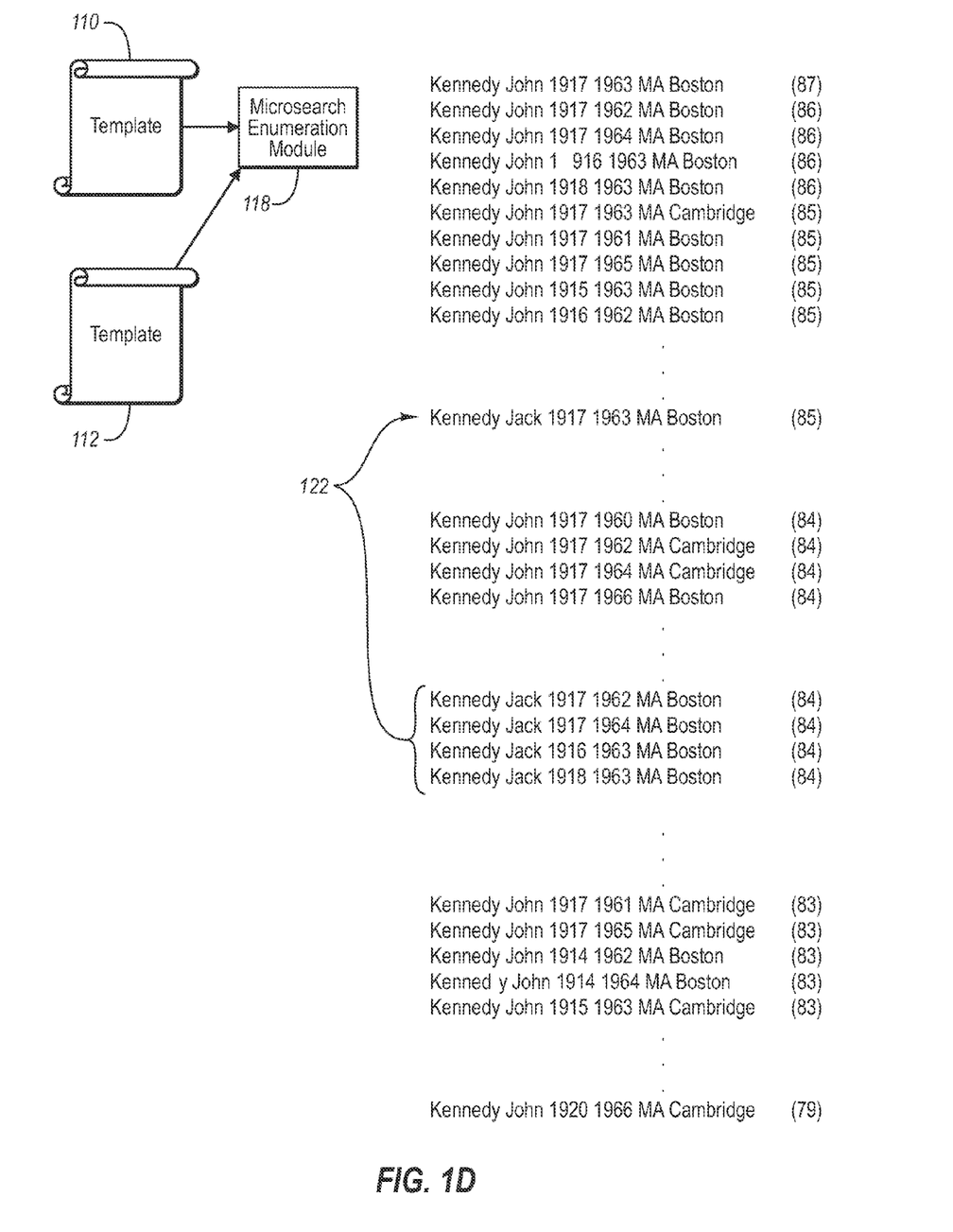
FIG. 1D illustrates enumerating microsearches.

An example of this is illustrated in FIG. 1D. FIG. 1D illustrates an example where templates 110 and 112 have had microsearches enumerated and interleaved together. Further, while, for convenience, only templates 110 and 112 have been shown as having enumerated microsearches interleaved, it should be appreciated that in practice a number of templates may have all or a portion of their microsearches enumerated and interleaved. For example, consider that a third template with a weight range of 83-75. Thus, template 110 has a weight range of 87-79, template 112 has a weight range of 85-77, and the third template has a weight range of 83-75. As microsearches from template 110 are enumerated where their weights approach a weight of 85, microsearches from template 112 will begin to be enumerated and interleaved with the microsearches enumerated for template 110. Further, as weights of microsearches enumerated from template 110 and 112 approach 83, microsearches from the third template will begin to be enumerated and interleaved with the microsearches enumerated from templates 110 and 112. As can be appreciated, this process can be continued with other templates which have overlapping weights.

It is appropriate to note at this point that previously performed sub-microsearches may be used to eliminate searches from subsequent templates. For example, the results of the sub-microsearch illustrated above that was used to eliminate microsearches with Cambridge from the first template 110 may likewise be used to eliminate microsearches from the second template 112. Similarly, in some embodiments, previous results may be used to eliminate entire templates.

Figure 3:
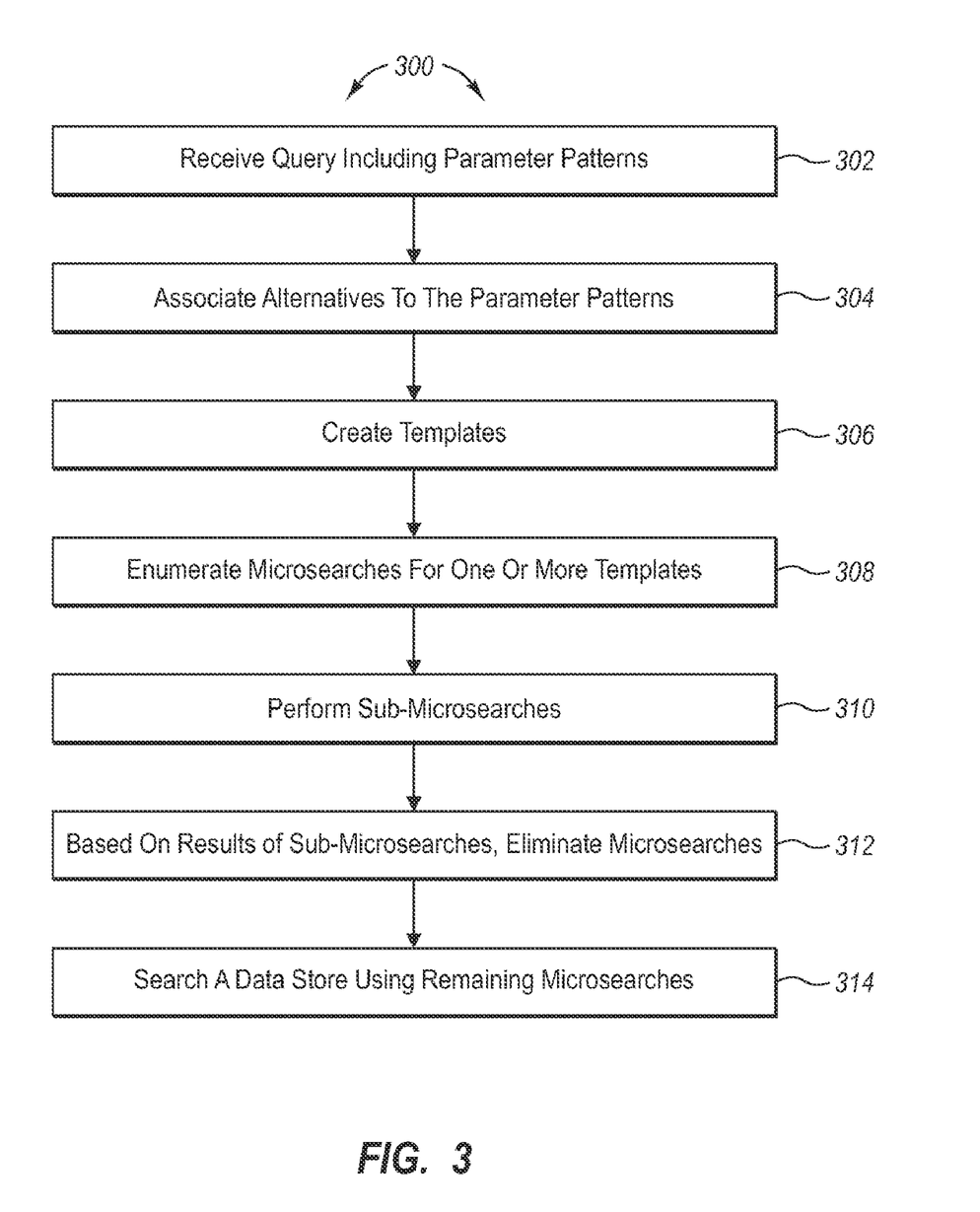
FIG. 3 illustrates a method of searching a data store.

Referring now to FIG. 3, a method 300 is illustrated. The method 300 illustrates a method that may be performed in a computing environment including a data store. The data store includes data items stored in records in the data store. The method includes acts for searching a data store for parameter patterns specified in a query. The method includes receiving a query from a user including N parameter patterns (act 302). For example, FIG. 1A illustrates a query 104 including a number of parameter patterns being received.

The method 300 further includes associating one or more alternatives to one or more of the N parameter patterns (act 304). An example of this is illustrated in FIG. 1A wherein an alternatives association module associates alternatives with the parameter patterns submitted in the query 104.

The method 300 further includes creating one or more templates (act 306). Each of the templates describes a number of microsearches where each of the microsearches includes one or more of the N parameter patterns or the alternatives. For example, FIG. 1B illustrates where parameter patterns alternatives 108 are supplied to a template generation module 106. The template generation module 106 uses the parameter patterns and alternatives 108 to generate a number of templates such as templates 110, 112, and 114.

As described previously, the method 300 may further include assigning weights to each of the parameter patterns specified in the query 104 and to each of the alternatives. Microsearches have weights based on the weights assigned to parameter patterns and/or alternatives in the microsearch. Based on the assigned weights, a weight range for may be determined for one or more of the templates. This weight range may be used for several functions including determining when to generate templates and when to enumerate microsearches.

As alluded to above, the method 300 further includes enumerating microsearches described by at least one of the one or more templates (act 308). FIG. 1C illustrates the enumeration of microsearches from a template such as template 110. Notably, in some embodiments all possible microsearches may be enumerated at a given time, all microsearches may be enumerated for one or more templates at a given time, or alternatively microsearches may be enumerated when needed.

In one embodiment, the act of enumerating microsearches is performed for a template in response to weights for microsearches being searched, as is described below in conjunction with the description of act 314, from an adjacent or other template approaching a weight range of the template. For example, reference is made to FIG. 1B. FIG. 1B illustrates the template 110 that has a weight range of 87-79. An adjacent template, template 112 has a weight range of 85-77. Thus, in one embodiment, when searches for microsearches with weights approaching or at 85 are being or have been performed, microsearches from the template 112 can be begun to be enumerated and searched as appropriate with the microsearches from the template 110. For example, microsearches from different templates can be interleaved with one another.

Further, in some embodiments creating one or more templates may include creating templates on basis as needed to allow for a determination to be made that weights for microsearches being searched are approaching a weight range of the template. However, in some alternative embodiments, creating one or more templates may include creating all templates prior to performing one or more microsearches.

Returning once again to FIG. 3, FIG. 3 illustrates that the method 300 further includes an act of performing one or more sub-microsearches (act 310). This may be done by searching for parameter patterns and/or alternatives where each sub-microsearch has less than all terms needed for a full microsearch. For example, as illustrated above, a sub-microsearch for template 110 may be Kennedy Cambridge. Notably, while a sub-microsearch may be a full microsearch in some templates, it may nonetheless be a sub-microsearch as to microsearches in other templates.

In one embodiment, performing one or more sub-microsearches may include searching an index for parameter patterns and/or alternatives. As discussed previously, various indexes may be used. In one embodiment, the index is an abbreviated index. For example, an abbreviated index, such as the abbreviated index illustrated in FIG. 2 may be used.

Embodiments may be implemented where searching an index comprises searching for index entries that index combinations of parameter patterns and/or alternatives. For example, an abbreviated index or full index of a data store may include single entries for combinations of parameter patterns. As noted previously, alternatives are also parameter patterns even though they are not specifically enumerated in a query. Thus, for example, an abbreviated index may include a bit which indexes the combination of Kennedy and Boston. Additionally, the index may have an absence of an indicator where Kennedy and Cambridge should be indexed. An absence of the combination may be used as one indicator for determining if microsearches should be eliminated from further searching of a data store. Other embodiments may search for individual terms of a sub-microsearch either in an abbreviated index or other index.

Searching an index may include searching for index entries that index ranges of parameter patterns and/or alternatives. For example, the indexed space can be divided into three separate areas: an exact hit, near hit (which includes the exact hit) and not near hit. A separate indexed hash entry in an offset correlation table or an abbreviated index can be made for the both the exact hit and the near hit.

Near can be defined in a variety of ways. One way is to define it in an absolute manner, independent of the data store and ranking algorithm. For example, a "near" state of the United States could be defined as any adjacent state to the exact hit state. A second way would be to define it based on a given data store, but independent of the ranking algorithm, and a third way would be to define "near" in terms also of the ranking algorithm which is employed. This latter might be a more logical choice in the case of a fixed ranking algorithm which implicitly defines "near" by giving higher rank to hits within a well defined "near" space. For example, if the ranking algorithm gives points for years within five years of the year requested, then one could define nearness of year to be within five years. Note that such a definition is not required. Note that nearness is not limited to numerical or spatial nearness, but may also include other forms of nearness such as linguistic nearness. One example of linguistic nearness relates to similarities between words. For example, nearness may be defined such that words that are more synonymous are nearer to each other. In another example, nearness may be defined based on the amount of misspelling of a word as compared to the word. Nearness may be defined in terms of similarity of pronunciations of the words. Nearness may be defined based on how common a nickname is for a particular given name. Other examples of nearness may also be implemented with the scope of the embodiments described herein.

While examples of determining nearness have been provided herein, it should be appreciated that other calculations and methods of determining nearness may be implemented within the scope of embodiments claimed herein. Any appropriate ranges described or defined by any appropriate systematic methodology may be used. Methodologies may be those expressible by computer executable algorithm, recursive partial function, or otherwise. Additionally, virtually any methodology generally recognized as a methodology for computation or description of proximity, distance, or metric between entities may be used.

The not near hit would be defined by the absence of both the exact hit and the near hit in either the offset correlation table or the abbreviated index.

For example, a search may be performed where the ranges include numeric proximity ranges. Illustratively, an index may include entries which include ranges of years indexed with other parameter patterns. Further, as illustrated above, the ranges may include geographic proximity ranges. Other ranges may also be included such as linguistic proximity ranges. Linguistic proximity ranges may index synonyms, homonyms, antonyms, or other language characteristics.

Referring once again to FIG. 3, the method 300 further illustrates based on the results of the one or more sub-microsearches, eliminating one or more microsearches from searching (act 312) As has been illustrated previously, the results of the sub-microsearches can be used to eliminate microsearches. For example, as illustrated above, if Kennedy Cambridge is not found in a sub-microsearch, then all microsearches with the parameter pattern Cambridge can be eliminated from searching.

The method 300 further includes searching the data store using one or more of the remaining microsearches (act 314). In one embodiment, searching the data store using one or more of the remaining microsearches is performed until a predetermined condition is satisfied. For example, the predetermined condition may include finding a prespecified number of records that satisfy the query. Satisfying the query may include finding a record for a microsearch.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment including a data store, the data store including data items stored in records in the data store, a method of searching a data store for parameter patterns specified in a query, the method comprising:

receiving a query from a user including N parameter patterns;

associating one or more alternatives to one or more of the N parameter patterns with one or more of the N parameter patterns;

creating one or more templates, wherein each of the templates includes a plurality of microsearches, wherein each microsearch including one or more of the N parameter patterns or the alternatives;

assigning weights to each of the N parameter patterns and to each of the alternatives, wherein microsearches have weights based on the weights assigned to parameter patterns and/or alternatives in the microsearch;

determining a weight range for one or more of the templates based on the assigned weights;

enumerating specifically all or a portion of the microsearches described by at least one of the one or more templates, wherein enumerating microsearches is performed for a template in response to weights for microsearhes being searched from another template approaching a weight range of the template;

performing one or more sub-microsearches from the microsearches, wherein the sub-microsearch includes less than all the parameter patterns and the alternatives in the microsearch;

searching the sub-microsearches for parameter patterns and alternatives;

eliminating one or more microsearches from further searching if the parameter patterns and the alternatives do not appear in the same record of the data store based on the results of the one or more sub-microsearches; and searching the data store using one or more of the remaining microsearches.

2. The method of claim 1, wherein searching the data store using one or more of the remaining microsearches is performed until a predetermined condition is satisfied.

3. The method of claim 2, wherein the predetermined condition comprises finding a prespecified number of records that satisfy the query.

4. The method of claim 3, wherein satisfying the query comprises finding a record for a microsearch.

5. The method of claim 1, further comprising:

assigning weights to each of the N parameter patterns and to each of the alternatives, wherein microsearches have weights based on the weights assigned to parameter patterns and/or alternatives in the microsearch;

based on the assigned weights, determining a weight range for one or more of the templates; and wherein the act of enumerating microsearches is performed for a template in response to weights for microsearches being searched from another template approaching a weight range of the template.

6. The method of claim 5, wherein creating one or more templates comprises creating templates on an as needed basis in determining that weights for microsearches being searched are approaching a weight range of the template.

7. The method of claim 5, wherein creating one or more templates comprises creating all templates prior to performing one or more microsearches.

8. The method of claim 1, wherein performing one or more sub-microsearches comprises searching an index for parameter patterns and/or alternatives.

9. The method of claim 8, wherein the index is an abbreviated index.

10. The method of claim 8, wherein searching an index comprises searching for index entries that index combinations of parameter patterns and/or alternatives.

11. The method of claim 8, wherein searching an index comprises searching for index entries that index ranges of parameter patterns and/or alternatives.

12. The method of claim 11, wherein the ranges are defined by a systematic methodology and wherein the methodology is generally recognized as a methodology for computation or description of at least one of proximity, distance, or metric between entities.

13. The method of claim 12, wherein the systematic methodology is expressed by a computer executable algorithm.

14. The method of claim 12, wherein the systematic methodology is expressed by a recursive partial function.

15. The method of claim 11, wherein the ranges comprise numeric proximity ranges.

16. The method of claim 11, wherein the ranges comprise geographic proximity ranges.

17. The method of claim 11, wherein the ranges comprise linguistic proximity ranges.

18. The method of claim 1, wherein performing one or more sub-microsearches comprises selecting sub-microsearch terms to facilitate eliminating one or more entire templates and corresponding described microsearches from searching.

19. In a computing environment including a data store, the data store including data items stored in records in the data store, a computer readable medium storing computer executable instructions that when executed by one or more processors cause one or more processors to perform the following:

receiving a query from a user including N parameter patterns;

associating one or more alternatives to one or more of the N parameter patterns;

creating one or more templates, wherein each of the templates includes a plurality of microsearches, wherein each microsearch including one or more of the N parameter patterns or the alternatives;

assigning weights to each of the N parameter patterns and to each of the alternatives, wherein microsearches have weights based on the weights assigned to parameter patterns and/or alternatives in the microsearch;

determining a weight range for one or more of the templates based on the assigned weights;

enumerating specifically all or a portion of the microsearches described by at least one of the one or more templates, wherein enumerating microsearches is performed for a template in response to weights for microsearches being searched from another template approaching a weight range of the template;

performing one or more sub-microsearches from the microsearches, wherein the sub-microsearch includes less than all the parameter patterns and the alternatives in the microsearch;

searching the sub-microsearches for parameter patterns and alternatives;

eliminating one or more microsearches from further searching if the parameter patterns and the alternatives do not appear in the same record or the data store based on the results of the one or more sub-microsearches; and searching the data store using one or more of the remaining microsearches.

20. In a computing environment including a data store, the data store including data items stored in records in the data store, a system for searching a data store for parameter patterns specified in a query, the system comprising:

one or more processors;

a computer readable memory coupled to the one or more processors, the computer readable memory storing computer executable instructions that when executed by the one or more processors cause the one or more processors to perform the following acts:

receiving a query from a user including N parameter patterns;

associating one or more alternatives to one or more of the N parameter patterns;

creating one or more templates, wherein each of the templates includes a plurality of microsearches, wherein each microsearch including one or more of the N parameter patterns or the alternatives;

assigning weights to each of the N parameter patterns and to each of the alternatives, wherein microsearches have weights based on the weights assigned to parameter patterns and/or alternatives in the microsearch;

determining a weight range for one or more of the templates based on the assigned weights;

enumerating specifically all or a portion of the microsearches described by at least one of the one or more templates, wherein enumerating microsearches is performed for a template in response to weights for microsearches being searched from another template approaching a weight range of the template;

performing one or more sub-microsearches from the microsearches, wherein said sub-microsearch includes less than all the parameter patterns and the alternatives in the microsearch;

searching the sub-microsearches for parameter patterns and alternatives;

eliminating one or more microsearches from further searching if the parameter patterns and the alternatives do not appear in the same record of the data store based on the results of the one or more sub-microsearches; and searching the data store using one or more of the remaining microsearches.

* * * * *

UNITED STATES PATENT AND TRADEMARK OFFICE
CERTIFICATE OF CORRECTION

| | | |
|---|---|---|
| PATENT NO. | : 7,774,353 B2 | Page 1 of 1 |
| APPLICATION NO. | : 11/847869 | |
| DATED | : August 10, 2010 | |
| INVENTOR(S) | : Millett et al. | |

It is certified that error appears in the above-identified patent and that said Letters Patent is hereby corrected as shown below:

Column 4
Line 17, change "alternative" to --alternatives--
Line 46, change "micorsearches" to --microsearches--
Line 59, after "Kennedy-John-Cambridge as" insert --a--

Column 5
Line 60, change both instances of "208" to --200--

Column 6
Line 4, change "pattern. "red fox"" to --pattern, "red fox"--
Line 5, change "pattern. "red fox"" to --pattern, "red fox"--
Line 32, change "table 208" to --table 200--
Line 39, change "table 208" to --table 200--

Column 8
Line 50, after "track" insert --of--

Column 9
Line 4, change "desireable" to --desirable--
Line 8, change "second 112" to --second template 112--

Column 10
Line 1, remove [for]
Line 29, change "basis as needed" to --an as needed basis--

Column 11
Line 6, remove [the]
Line 59, change "(act 312) As" to --(act 312). As--

Signed and Sealed this
Fifteenth Day of March, 2011

David J. Kappos
*Director of the United States Patent and Trademark Office*